(12) United States Patent
Zandbergen et al.

(10) Patent No.: US 7,029,017 B2
(45) Date of Patent: Apr. 18, 2006

(54) WHEEL SUSPENSION FOR A MOTOR VEHICLE WITH A TRANSVERSE LEAF SPRING

(75) Inventors: Paul Zandbergen, Vaals (NL); Shawn Chambers, Cambs (GB)

(73) Assignee: Ford Global Technologies, LLC, Dearborn, MI (US)

( * ) Notice: Subject to any disclaimer, the term of this patent is extended or adjusted under 35 U.S.C. 154(b) by 350 days.

(21) Appl. No.: 10/611,734

(22) Filed: Jul. 2, 2003

(65) Prior Publication Data

US 2004/0004336 A1 Jan. 8, 2004

(30) Foreign Application Priority Data

Jul. 2, 2002 (EP) .................................. 02100775

(51) Int. Cl.
*B60G 21/055* (2006.01)
*B60G 11/08* (2006.01)

(52) U.S. Cl. .................... 280/124.106; 280/124.166; 280/124.171

(58) Field of Classification Search ......... 280/124.171, 280/124.177, 124.106, 124.125, 124.107, 280/124.166, 124.17
See application file for complete search history.

(56) References Cited

U.S. PATENT DOCUMENTS

| 402,789 | A | * | 5/1889 | Waterhouse | 267/273 |
|---|---|---|---|---|---|
| 2,695,791 | A | * | 11/1954 | Heftler | 280/124.128 |
| 2,728,569 | A | * | 12/1955 | Schlegel, Jr. | 267/228 |
| 3,029,090 | A | * | 4/1962 | Fiala et al. | 280/124.102 |
| 3,250,546 | A | * | 5/1966 | Allison | 280/124.176 |
| 3,831,966 | A | | 8/1974 | Grosseau | |
| 4,611,793 | A | * | 9/1986 | Nishiyama et al. | 267/52 |
| 4,659,071 | A | * | 4/1987 | Woltron | 267/149 |
| 4,695,791 | A | * | 9/1987 | Miller | 324/76.62 |
| 4,725,074 | A | | 2/1988 | Stevens | |
| 4,771,997 | A | * | 9/1988 | Haldenwanger et al. | 267/260 |
| 4,802,659 | A | * | 2/1989 | Hope | 267/149 |
| 4,895,350 | A | * | 1/1990 | Schoof et al. | 267/52 |
| 4,969,633 | A | * | 11/1990 | Ryan | 267/47 |
| 5,810,338 | A | * | 9/1998 | Koenig et al. | 267/273 |
| 5,833,026 | A | * | 11/1998 | Zetterstrom et al. | 180/360 |
| 6,029,987 | A | * | 2/2000 | Hoffman et al. | 280/124.171 |
| 6,361,032 | B1 | * | 3/2002 | Lawson | 267/158 |
| 6,398,451 | B1 | | 6/2002 | Zetterstrom | |
| 6,755,403 | B1 | * | 6/2004 | Novy et al. | 267/141 |
| 6,811,169 | B1 | * | 11/2004 | Schroeder et al. | 280/124.171 |
| 6,893,034 | B1 | * | 5/2005 | Fader | 280/124.166 |
| 2002/0000703 | A1 | | 1/2002 | Lawson et al. | |

FOREIGN PATENT DOCUMENTS

| DE | 3612777 A1 | 4/1986 |
|---|---|---|
| EP | 0-243-102 A1 | 4/1987 |
| EP | 0-243-102 B1 | 4/1987 |
| EP | 0-318-753 A1 | 11/1988 |

(Continued)

*Primary Examiner*—.5qPaul N. Dickson
*Assistant Examiner*—Barry Gooden, Jr.
(74) *Attorney, Agent, or Firm*—Gary A. Smith

(57) ABSTRACT

A wheel suspension with a transverse leaf spring (1a–1c) which is articulated at both ends on wheel carriers. The transverse leaf spring shaped symmetrically to the vehicle longitudinal axis (L) has a curved profile with a middle region (1a) offset parallel to the wheel axis. The transverse leaf spring is supported on the vehicle body by means of two transverse leaf spring bearings (2) with high lateral rigidity. The curved profile of the transverse leaf spring with four arcs (1d, 1e) allows for a bending of the middle region (1a) to take place essentially without a change in the tread width.

10 Claims, 2 Drawing Sheets

FOREIGN PATENT DOCUMENTS

| | | |
|---|---|---|
| EP | 0-318-753 B1 | 11/1988 |
| EP | 0-507-975 B1 | 4/1991 |
| EP | 1-080-953 A1 | 3/1999 |
| GB | 2-111-922 A | 7/1983 |
| JP | 02117408 | 5/1999 |

* cited by examiner

WHEEL SUSPENSION FOR A MOTOR VEHICLE WITH A TRANSVERSE LEAF SPRING

BACKGROUND OF THE INVENTION

The invention relates to a wheel suspension for a motor vehicle with a transverse leaf spring which is arranged transversely to the vehicle and which is connected to the motor vehicle body via at least one transverse leaf spring bearing and is articulated on at least one wheel carrier.

A wheel suspension of the type initially mentioned is known from EP 1 080 953 A1, the transverse leaf spring described there being shaped symmetrically in relation to the vehicle longitudinal mid-plane, being mounted on both sides and being supported at both ends via spring arms. In this arrangement, the transverse leaf spring replaces the helical spring present in conventional wheel suspensions, and also the stabilizer and further link arms. In this and similar approaches, however, there is the problem that the movement of the compression and rebound of the wheels which takes place in the vertical direction leads to a considerable change in the tread width, which, in turn, results in an undesirable change in the toe-in. Furthermore, in the known systems, it is left open how the stabilizer function is to be fully integrated without any disadvantages with respect to the rolling rate.

SUMMARY OF THE INVENTION

Against this background, the object of the present invention was to provide an improved wheel suspension with a transverse leaf spring, which, along with a low weight and without disadvantages in terms of kinematics and of rolling rate, integrates the functions of the springing, of various links and preferably also of the stabilizer system.

The wheel suspension according to the invention for a motor vehicle has a wheel-guiding transverse leaf spring which is arranged essentially transversely to the vehicle and which is connected to the motor vehicle body via at least one associated transverse leaf spring bearing and is articulated on at least one wheel carrier (steering knuckle) of the wheel. The wheel suspension is defined in that the transverse leaf spring has (at least) two essentially straight portions which are connected via an arc. Preferably, in this case, the arc describes an angle of between approximately 60° and 120° with relatively sharp curvature.

By virtue of the transverse leaf spring being shaped with an arc or a bend, a considerably improved driving behavior is achieved, since the bends of the transverse leaf spring which take place during a compression and rebound of the wheels lead to reduced changes in the tread width. Owing to the reduced lateral movement of the wheels, the transverse leaf spring bearings can then be designed with greater lateral rigidity, so that the entire wheel suspension advantageously acquires high lateral rigidity.

According to a preferred embodiment, the transverse leaf spring has, in addition to the first arc, a second arc curved opposite to the first arc. The two arcs together thus result in a Z shape of the transverse leaf spring which has a step-like offset. The mutually offset parallel portions of the transverse leaf spring may in this case be arranged, in particular, transversely to the vehicle longitudinal axis.

It is particularly preferred if the transverse leaf spring connects the two wheels of an axle and, for this purpose, is articulated at each of its two ends on a wheel carrier. In this case, the transverse leaf spring may additionally assume the function of a stabilizer, that is to say transmit a one-sided compression or rebound of one wheel to the opposite wheel. A transverse leaf spring of this type is preferably shaped symmetrically to its center point or to the vehicle center, so that it possesses the same dynamic properties with respect to both wheels.

According to a development of the invention, the transverse leaf spring is designed nonuniformly along its extent, so that different regions have different elastic properties. In particular, in this case, a middle region of the transverse leaf spring may have a flat design (for example, with a flatly rectangular cross section), while at least one wheel-side end region of the transverse leaf spring has a compact, preferably square or round or circular cross section. The middle region then possesses high flexibility in one direction, so that it can effectively assume the functions of a spring and of a stabilizer. By contrast, the end region may be designed rigidly for all the load directions, in order thereby to be able to absorb the braking forces and lateral forces. It may, however, also be subjected to torsional stress and thus assume the function of the stabilizer.

To produce a transverse leaf spring, all materials with corresponding elastic properties and durabilities may be selected. Preferably, the transverse leaf spring is produced from glass fibers embedded in epoxy resin.

Specific portions of the transverse leaf spring, in particular regions subjected to torsional stress, may advantageously be reinforced by fibers wound at an angle around a core.

According to a development of the wheel suspension, preferably a wheel-side end of the transverse leaf spring is coupled to at least one longitudinal link which, in turn, is mounted on the motor vehicle body. By means of the longitudinal link, a transmission of force takes place between the wheel and the vehicle body in the longitudinal direction of the vehicle.

Furthermore, the wheel carriers may additionally be mounted on the motor vehicle body via at least one A-frame arm and/or via a damper strut. These mountings serve, in particular, for the transmission of vertically acting loads between the wheels and the vehicle body.

Another further development relates to a special embodiment of the transverse leaf spring bearings, with bearings of this type being capable of being used advantageously not only in wheel suspensions according to the present invention, but also in other types of wheel suspensions (with or without a transverse leaf spring). The transverse leaf spring bearings according to the invention have a thickening which surrounds the transverse leaf spring, the axial ends of the thickening (with respect to the axis of the transverse leaf spring) consisting of essentially planar surface pieces. Said surface pieces are in this case inclined at a relatively steep angle of typically 45° to 90° in relation to the axis of the transverse leaf spring. A high lateral rigidity of the transverse leaf spring bearing is thereby achieved. A slight inclination of the surface pieces with respect to a position perpendicular to the axis (90° angle) is in this case advantageous in terms of the assembly of the bearing.

The abovementioned thickenings preferably consist of a plastic of corresponding stability, which can absorb the force loads which occur. Advantageously, the thickenings are connected to the transverse leaf spring by nonpositive, materially integral and/or positive connection.

According to a development of the transverse leaf spring bearing, said thickening is surrounded by a casing consisting of an elastic material, such as, in particular, rubber, the casing, in turn, being framed by a housing shell. The housing shell, preferably consisting of metal, may be firmly connected to the vehicle body, while, by virtue of its elastic properties, the rubber located between the housing shell and the thickening ensures the desired flexibility of the transverse leaf spring bearing. The extent of this flexibility may be set, as required, by the choice of material and the dimensioning.

BRIEF DESCRIPTION OF THE DRAWINGS

The invention is explained in more detail below, by way of example, with reference to the figures of which.

DETAILED DESCRIPTION OF THE PREFERRED EMBODIMENTS

Figure 1:
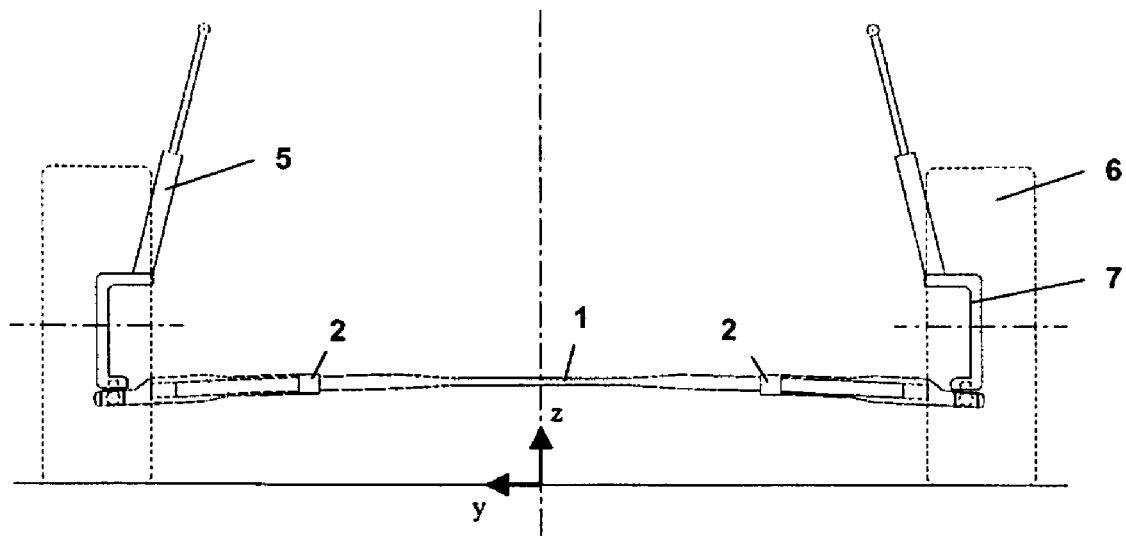
FIG. 1 shows a front view of a wheel suspension according to the invention for the front wheels of a motor vehicle.
Figure 2:
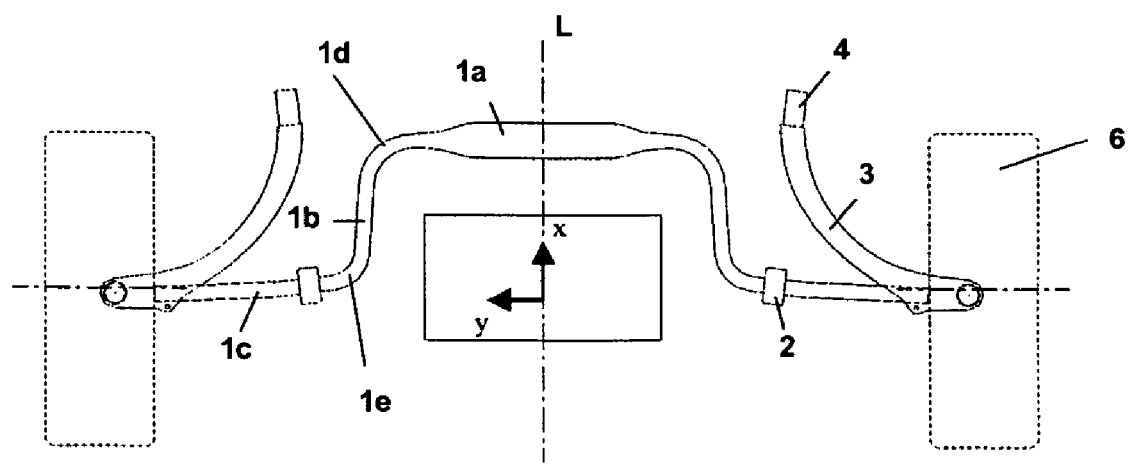
FIG. 2 shows a top view of a wheel suspension according to FIG. 1.

FIGS. 1 and 2 show two different views of a wheel suspension according to the invention by the example of the front wheels, although the wheel suspension can also be implemented in a similar way with regard to the rear wheels.

The central element of the wheel suspension is a transverse leaf spring 1 which extends between the two wheels 6 transversely to the vehicle longitudinal axis L pointing in the x-direction and which is articulated at its ends on the wheel carriers 7. As can be seen in the front view of FIG. 1, the transverse leaf spring 1 extends with a slight upward curvature in a plane parallel to the road.

According to the top view of FIG. 2, the particular feature of the transverse leaf spring 1 is that it has, on both sides of the middle region 1a, arcs 1d of approximately 90° which connect the middle region 1a to torsional portions 1b running in the direction of the vehicle axis L. The torsional portions 1b are, in turn, connected to end portions 1c of the transverse leaf spring in each case via a second arc 1e of approximately 90°, so that the end portions 1c again run essentially transversely to the vehicle longitudinal axis L and consequently parallel to the middle portion 1a. The transverse leaf spring 1, designed symmetrically to the vehicle mid-plane, is thus defined by a middle region 1a offset parallel to the wheel axis.

The transverse leaf spring 1 is connected to crossmembers (not illustrated) and consequently to the vehicle body via two transverse leaf spring bearings 2.

When the two wheels 6 are compressed or rebound in phase (that is to say, are deflected in the vertical z direction), the transverse leaf spring 1 is subjected to bending stress particularly in its middle region 1a, with the result that it acts in the same way as vertical springing. When the two wheels 6 are compressed or rebound in antiphase, the transverse leaf spring 1 is subjected to bending and torsional stress, with the result that it assumes the function of a stabilizer which couples the two wheels 6 to one another.

Of conventional transverse leaf springs running essentially straight from one wheel to the other, it is known that these lead to a relatively large change in tread width in the event of a vertical movement of the wheels 6. This results from the fact that, when the transverse leaf spring bends, the necessary lengthening in the middle region is compensated by the end portions being drawn inward. By virtue of the direct coupling of the transverse leaf spring to the wheels, this leads, in the case of conventional straight transverse leaf springs, to said change in the tread width and consequently to an undesirable change in the toe-in being made.

An effect of this kind is prevented in the shaping according to the invention of the transverse leaf spring 1. The middle region 1a of the transverse leaf spring, said region being arranged so as to be offset by means of the arcs 1d, 1e, can, when said region bends, draw the adjacent torsional portions 1b inward, without this necessarily being transmitted to the end portions 1c of the transverse leaf spring. To be precise, the required lengthening in the middle region 1a can be provided by a corresponding stretching of the arcs 1d, 1e, so that the movements of the end portions 1c are minimized. The effects on the tread width and the toe-in are correspondingly reduced to an extent known from conventional wheel suspensions (without a transverse leaf spring). This means, in turn, that the transverse leaf spring bearings 2 may possess very high lateral rigidity which results in achieving the desirable high lateral rigidity of the entire wheel suspension.

A further advantage of the curved shape of the transverse leaf spring 1 is that, when it is used on the front axle, space is provided for accommodating the engine, the transmission, the steering rod or the like.

The transverse leaf spring 1 may be produced, in particular, from glass fibers in epoxy resin. The cross-sectional area of the transverse leaf spring 1 is in this case essentially constant when the transverse leaf spring 1 is produced from a continuous unidirectional fiber bundle. In order, under these conditions, to make the bending rigidity along the transverse leaf spring 1 locally different, different cross-sectional shapes, in particular different ratios of height to width, may be set.

To integrate the stabilizer function into the transverse leaf spring, it is necessary, in this respect, for the middle portion 1a of the transverse leaf spring to have considerably lower bending rigidity in the z direction than the ends. For this reason, the middle region 1a is designed with a relatively small vertical height (measured in the z direction perpendicularly to the road) and with a relatively large horizontal width (measured in the x direction) to produce a generally flat cross-section, while the torsional portions 1b and the end portions 1c have a non-flat or compact cross-sectional area (cf FIG. 4), such as a square or circle. The torsional portions 1b may in this case be reinforced by fibers which are wound at a defined angle around the unidirectional core.

As can be seen from FIG. 2, a thrust rod 3 is coupled as a longitudinal link to the ends of the transverse leaf spring 1 by means of a clamp integrated into this rod. As regards a wheel suspension with a mounting point in front of the wheel 6, the corresponding rod is a tension rod. This is a typical application for rear-wheel suspensions and specific front-wheel suspensions.

The other end of the thrust rod 3 has a bearing sleeve which is attached to a crossmember 4. The thrust rod 3 and bearing sleeve assume the functions of absorbing the wheel load pointing in the longitudinal direction, of controlling the resilience of the wheel suspension in the longitudinal direction and of controlling the kinematics of the wheel suspension (anti-dive). Furthermore, a ball joint is integrated into the thrust rod 3, so that the latter can be connected to the wheel carrier (wheel knuckle).

The remaining wheel support is provided by the damper strut 5 which can be seen in FIG. 1 and which is articulated at its top on the vehicle body. Alternatively, however, the transverse leaf spring 1 according to the invention may also be used, for example, in a wheel suspension with a double A-frame arm.

Figure 3:
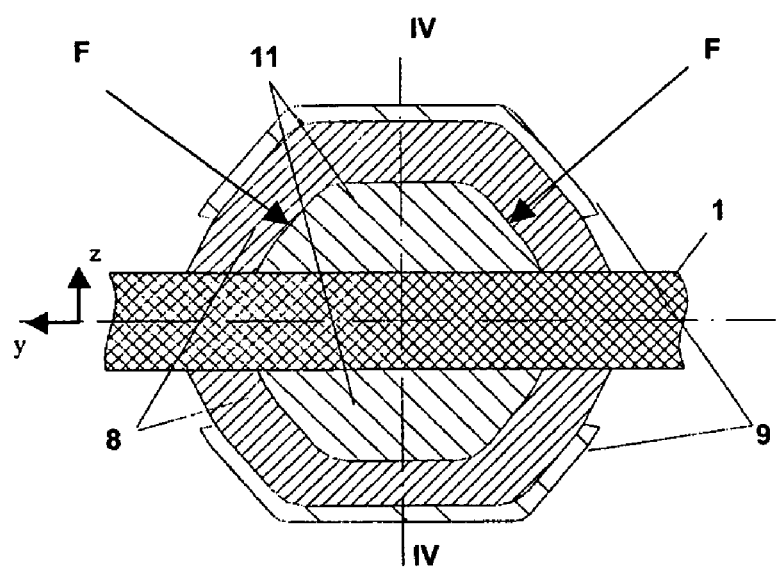
FIG. 3 shows a section through a transverse leaf spring bearing according to the invention in the longitudinal direction of the transverse leaf spring (the line III—III of FIG. 4)
Figure 4:
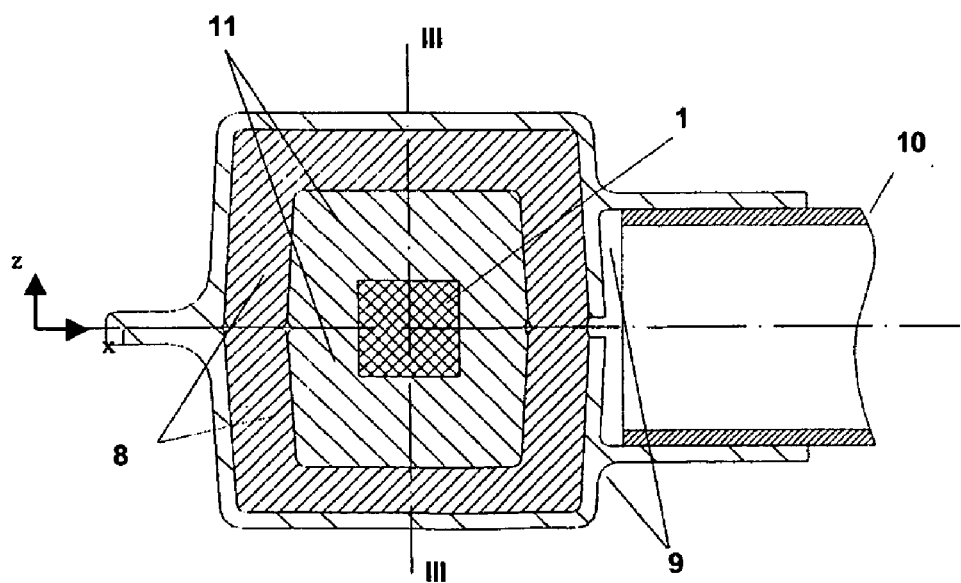
FIG. 4 shows a section through the bearing according to FIG. 3 transversely to the transverse leaf spring (the line IV—IV of FIG. 3).

FIGS. 3 and 4 show two mutually perpendicular sections through the transverse leaf spring bearings 2, by means of which the transverse leaf spring 1 is supported on the vehicle body. The bearing has a multishell construction, the core of which is formed by a thickening 11 surrounding the transverse leaf spring 1 which in this region has a square cross section. The thickening 11 consists of two mirror-symmetrical parts which are connected to the transverse leaf spring 1 preferably by materially integral connection (for example by being injection-molded on or integrally cast). The thickenings 11 may consist of a plastic which is sufficiently strong to absorb the vertical and transverse loads which take effect. The two halves of the thickening 11 have a trapezoidal shape both in longitudinal section (FIG. 3) and in cross section (FIG. 4), the axial ends of the thickenings 11 being formed by surface pieces F inclined to the axis of the transverse leaf spring 1. The lateral support (in the y direction) of surface pieces of this type is greater than it would be in the case of a, for example, spherical thickening. The trapezoidal shape of the thickening 11 thereby ensures that lateral support is available over the entire movement of compression and rebound of the transverse leaf spring 1.

Furthermore, the plastic thickening 11 is surrounded by a rubber casing 8 which is tied to an upper and a lower housing shell 9. The two shells 9 clamp the rubber 8 between them and are fastened to the crossmember 10 of the vehicle body.

The trapezoidal shape of the thickening 11 additionally contributes to the rubber 8 being held more effectively in its place. A sliding movement between the thickening 11 and the rubber 8 and between the rubber 8 and the housing parts 9 is thereby prevented, with the result that the hysteresis of the wheel suspension is minimized. Instead of the trapezoidal shape of the thickening 11 and rubber casing 8, a rectangular shape of these parts could also be selected. In this case, however, the bearing would be more difficult to mount, so that the small angles, illustrated in FIGS. 3 and 4, of the side walls F of the thickening 11 relative to a vertical of the transverse leaf spring 1 are advantageously provided.

The behavior of the transverse leaf spring bearing 2 can be set by means of the size and shape of the thickenings 11 and by means of the properties of the rubber 8. By means of voids in the rubber 8, a nonlinear behavior can be provided. The loads on the bearings determine the quantity of rubber 8 necessary for achieving a long-lived construction.

The transverse leaf spring bearings 2 are under constant prestress, since the path of the static load between the vehicle body and the ground runs via these bearings. For this reason, preferably, more rubber 8 is provided on the top side of the transverse leaf spring than on the underside.

The bearings 2 described are, of course, also suitable for receiving other links or the like instead of the transverse leaf spring 1.

In the wheel suspension described above, an integration of the functions of springing, stabilizer and lateral wheel support in a flexible transverse carrier spring is achieved, without detriments with regard to kinematics and resilience, as compared with conventional suspensions, having to be taken into account.

What is claimed is:

1. A motor vehicle having a wheel suspension including a transverse leaf spring, wherein the transverse leaf spring comprises:
   a middle region extending generally transversely to the motor vehicle;
   a torsional portion extending generally parallel with a longitudinal axis of the motor vehicle;
   a first arc connecting a first end of the middle region with a first end of the torsional portion;
   an end portion extending generally transversely to the motor vehicle and having a wheel-side end adapted for connection to at least one wheel carrier;
   a transverse leaf spring bearing connected to the end portion and adapted for connection to a body of the vehicle; and
   a second arc connecting a second end of the torsional portion with a second end of the end portion.

2. The motor vehicle as claimed in claim 1, wherein the transverse leaf spring consists of glass fibers embedded in epoxy resin.

3. The motor vehicle as claimed in claim 1, wherein at least one portion of the transverse leaf spring is reinforced by fibers wound around a core.

4. The motor vehicle as claimed in claim 1, wherein at least one end of the transverse leaf spring is coupled to a longitudinal link mounted on the motor vehicle body.

5. The motor vehicle as claimed in claim 1, wherein the transverse leaf spring bearing has a thickening surrounding the transverse leaf spring and the axial ends of which consist of planar surface pieces.

6. The motor vehicle as claimed in claim 5, wherein the thickening is surrounded by a casing consisting of elastic material which is framed in a housing shell.

7. The motor vehicle as claimed in claim 6, wherein the elastic material is rubber.

8. The wheel suspension as claimed in claim 1, wherein at least a portion of the middle region has a first bending rigidity about the longitudinal axis and a second bending rigidity about a vertical axis, the first bending rigidity being less than the second bending rigidity.

9. The wheel suspension as claimed in claim 8, wherein the at least a portion of the middle region has a vertical height measured along the vertical axis and a horizontal width measured along the longitudinal axis, the vertical height being less than the horizontal width.

10. The wheel suspension as claimed in claim 1, wherein at least a portion of the torsional portion has a first bending rigidity about the longitudinal axis and a second bending rigidity about a vertical axis, the first bending rigidity being generally equal to the second bending rigidity.

* * * * *